US012651483B2

(12) United States Patent
Luo et al.

(10) Patent No.: US 12,651,483 B2
(45) Date of Patent: Jun. 9, 2026

(54) FACE LIVENESS DETECTION METHOD, SYSTEM, AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhao Luo, Shenzhen (CN); Kun Bai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 313 days.

(21) Appl. No.: 17/963,396

(22) Filed: Oct. 11, 2022

(65) Prior Publication Data

US 2023/0034040 A1     Feb. 2, 2023

Related U.S. Application Data

(63) Continuation of application No. PCT/CN2021/103452, filed on Jun. 30, 2021.

(30) Foreign Application Priority Data

Aug. 14, 2020     (CN) .......................... 202010815513.3

(51) Int. Cl.
| | |
|---|---|
| *G06V 40/40* | (2022.01) |
| *G06F 21/60* | (2013.01) |

(Continued)

(52) U.S. Cl.
CPC ............ *G06V 40/45* (2022.01); *G06F 21/602* (2013.01); *G06V 10/764* (2022.01);
(Continued)

(58) Field of Classification Search
CPC .................. G06F 21/32; G06F 21/602; G06F 2221/2133; G06N 3/0455; G06N 3/0464;
(Continued)

(56) References Cited

U.S. PATENT DOCUMENTS

| | | | |
|---|---|---|---|
| 2006/0078176 | A1 | 4/2006 | Abiko et al. |
| 2017/0286788 | A1 | 10/2017 | Fan et al. |

(Continued)

FOREIGN PATENT DOCUMENTS

| | | |
|---|---|---|
| CN | 105227316 A | 1/2016 |
| CN | 107590465 A | 1/2018 |

(Continued)

OTHER PUBLICATIONS

Ma et al, "A Secure Face-Verification Scheme Based on Homomorphic Encryption and Deep Neural Networks", IEEE, 2017. (Year: 2017).*

(Continued)

*Primary Examiner* — Ruiping Li
(74) *Attorney, Agent, or Firm* — Banner & Witcoff, Ltd.

(57) ABSTRACT

Methods, apparatus, systems, and storage medium for a face liveness detection are provided. The method includes obtaining an image comprising a face of an object; extracting an image feature of the image through an encryption network in a joint model for encryption and detection; performing image reconstruction based on the image feature to obtain an encrypted image corresponding to the image, the encrypted image being different in image content from the image; transmitting the encrypted image to a liveness detection server, wherein the liveness detection server is configured to perform liveness detection on the encrypted image through a detection network in the joint model for encryption and detection to obtain a liveness detection result of the object in the image; and receiving the liveness detection result of the object in the image from the liveness detection server.

17 Claims, 10 Drawing Sheets

(51) Int. Cl.

| | |
|---|---|
| *G06V 10/764* | (2022.01) |
| *G06V 10/774* | (2022.01) |
| *G06V 10/82* | (2022.01) |
| *G06V 10/94* | (2022.01) |
| *G06V 40/16* | (2022.01) |

(52) U.S. Cl.
CPC .......... *G06V 10/7747* (2022.01); *G06V 10/82* (2022.01); *G06V 10/95* (2022.01); *G06V 40/171* (2022.01); *G06V 40/172* (2022.01)

(58) Field of Classification Search
CPC ...... G06N 3/09; G06V 10/454; G06V 10/764; G06V 10/7747; G06V 10/778; G06V 10/82; G06V 10/95; G06V 40/161; G06V 40/168; G06V 40/171; G06V 40/172; G06V 40/45
See application file for complete search history.

(56) References Cited

U.S. PATENT DOCUMENTS

| | | | |
|---|---|---|---|
| 2019/0213816 A1 | 7/2019 | Grigorov et al. | |
| 2020/0065562 A1 | 2/2020 | Zhou et al. | |
| 2021/0166045 A1 * | 6/2021 | Kwak ................. | G06V 40/166 |

FOREIGN PATENT DOCUMENTS

| | | | |
|---|---|---|---|
| CN | 109784148 A | 5/2019 |
| CN | 110598580 A | 12/2019 |
| CN | 111325175 A | 6/2020 |
| CN | 111339897 A | 6/2020 |
| CN | 111680672 A | 9/2020 |

OTHER PUBLICATIONS

Ma et al, "A Secure Face-Verification Scheme Based on Homomorphic Encryption and Deep Neural Networks", 2017 (Year: 2017).*
Supplementary European Search Report regarding EP 21 85 5273 dated Jul. 18, 2023, 8 pages.
Salem et al, "Utilizing Transfer Learning and Homomorphic Encryption in a Privacy Preserving and Secure Biometric Recognition System," Computers, vol. 8, No. 1, XP093062545, Dec. 29, 2018.
Chinese Office Action with English concise explanation of relevance regarding 202010815513.3 dated Sep. 28, 2020, 7 pages.
Jun Huang et al., "Interactive liveness detection combining with head pose and facial expression," Journal of Computer Application, vol. 40, Issue 7, Jul. 10, 2020.
International Search Report with English translation regarding PCT/CN2021/103452 dated Sep. 28, 2021, 9 pages.

* cited by examiner

Face verification device
1. Obtain a to-be-detected image
2. Encrypt the to-be-detected image
through an encryption network to
obtain an encrypted image User Liveness detection server
1. Receive the encrypted image
2. Perform liveness detection
on the encrypted image through
a detection network

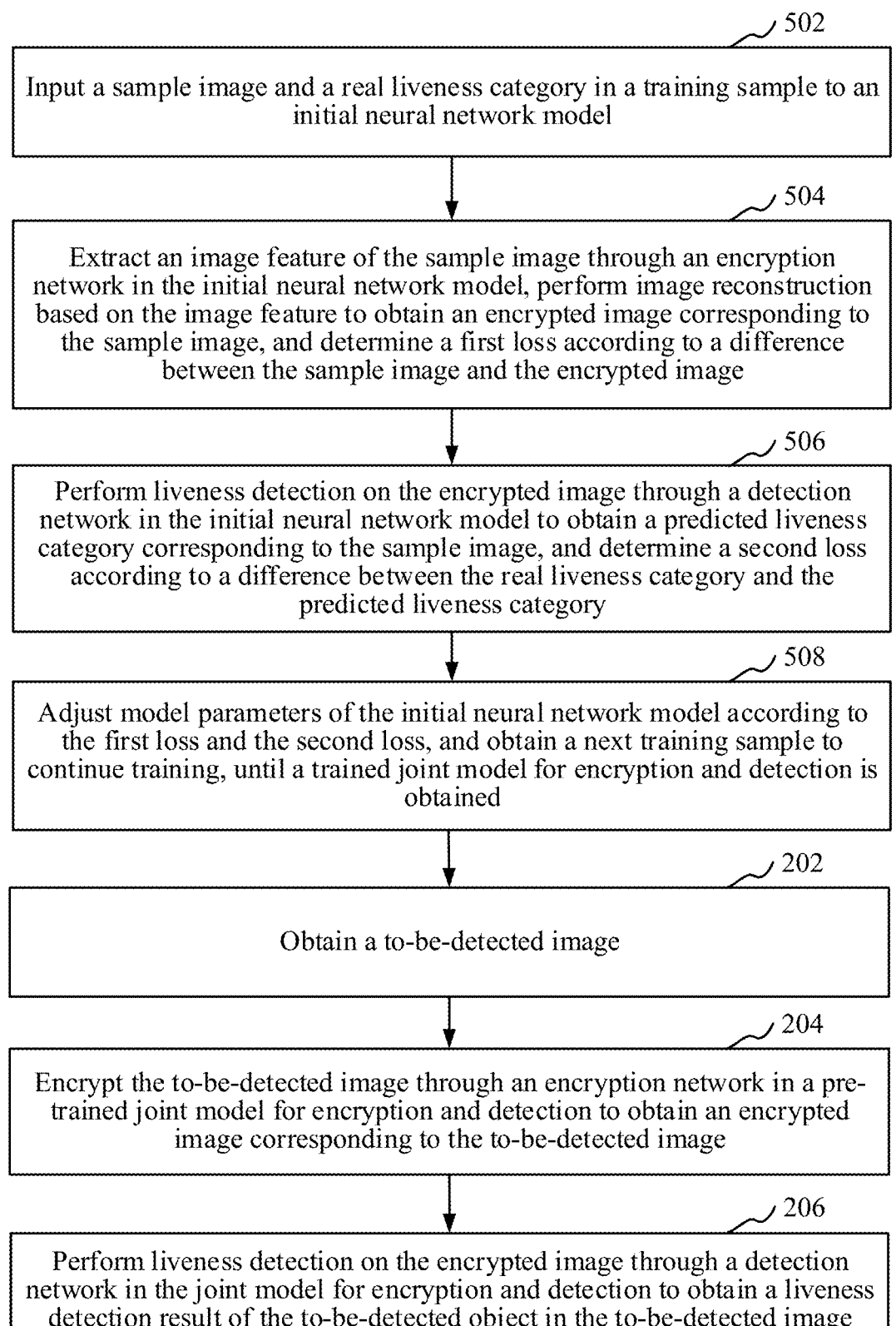

502

Input a sample image and a real liveness category in a training sample to an initial neural network model

504

Extract an image feature of the sample image through an encryption network in the initial neural network model, perform image reconstruction based on the image feature to obtain an encrypted image corresponding to the sample image, and determine a first loss according to a difference between the sample image and the encrypted image

506

Perform liveness detection on the encrypted image through a detection network in the initial neural network model to obtain a predicted liveness category corresponding to the sample image, and determine a second loss according to a difference between the real liveness category and the predicted liveness category

508

Adjust model parameters of the initial neural network model according to the first loss and the second loss, and obtain a next training sample to continue training, until a trained joint model for encryption and detection is obtained

202

Obtain a to-be-detected image

204

Encrypt the to-be-detected image through an encryption network in a pre-trained joint model for encryption and detection to obtain an encrypted image corresponding to the to-be-detected image

206

Perform liveness detection on the encrypted image through a detection network in the joint model for encryption and detection to obtain a liveness detection result of the to-be-detected object in the to-be-detected image

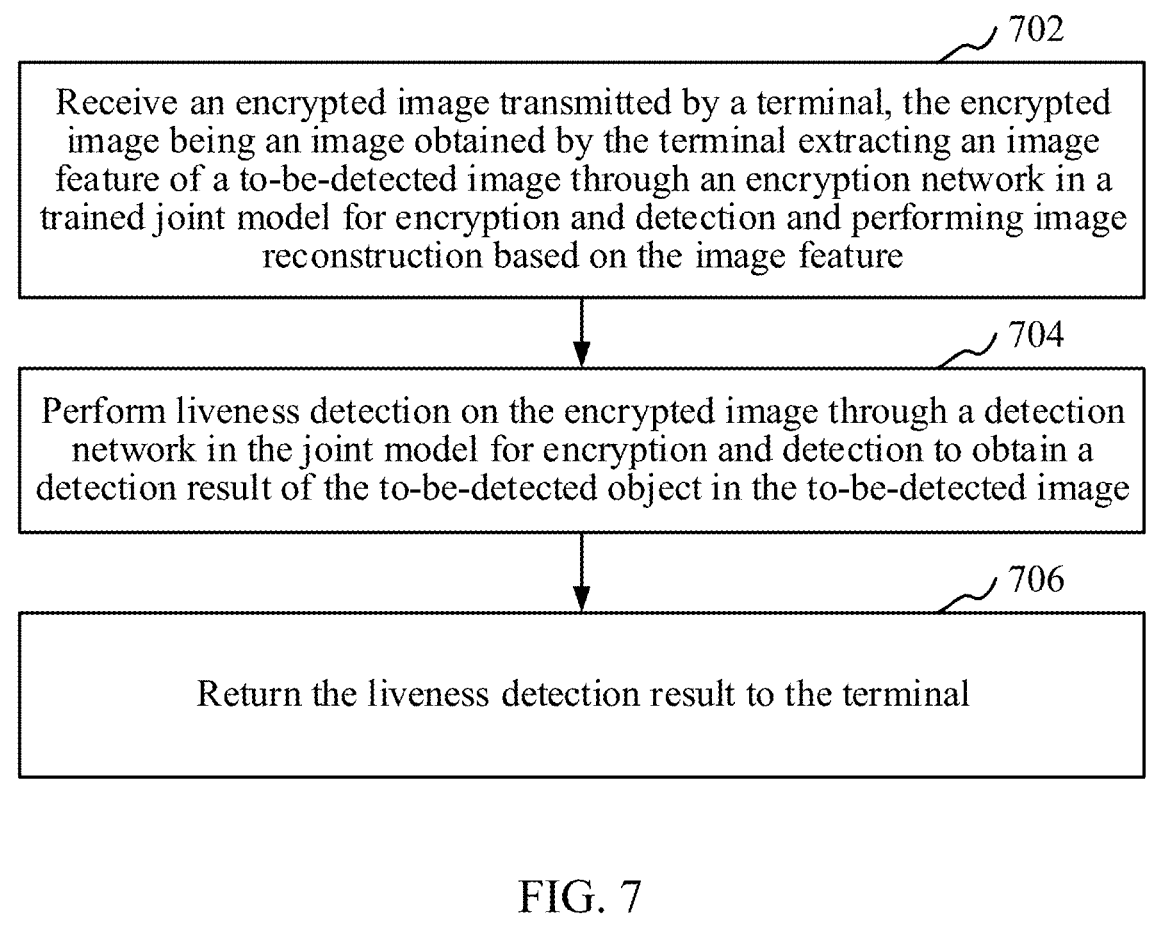

Receive an encrypted image transmitted by a terminal, the encrypted image being an image obtained by the terminal extracting an image feature of a to-be-detected image through an encryption network in a trained joint model for encryption and detection and performing image reconstruction based on the image feature

~⟋ 704

Perform liveness detection on the encrypted image through a detection network in the joint model for encryption and detection to obtain a detection result of the to-be-detected object in the to-be-detected image

~⟋ 706

Return the liveness detection result to the terminal

FIG. 7

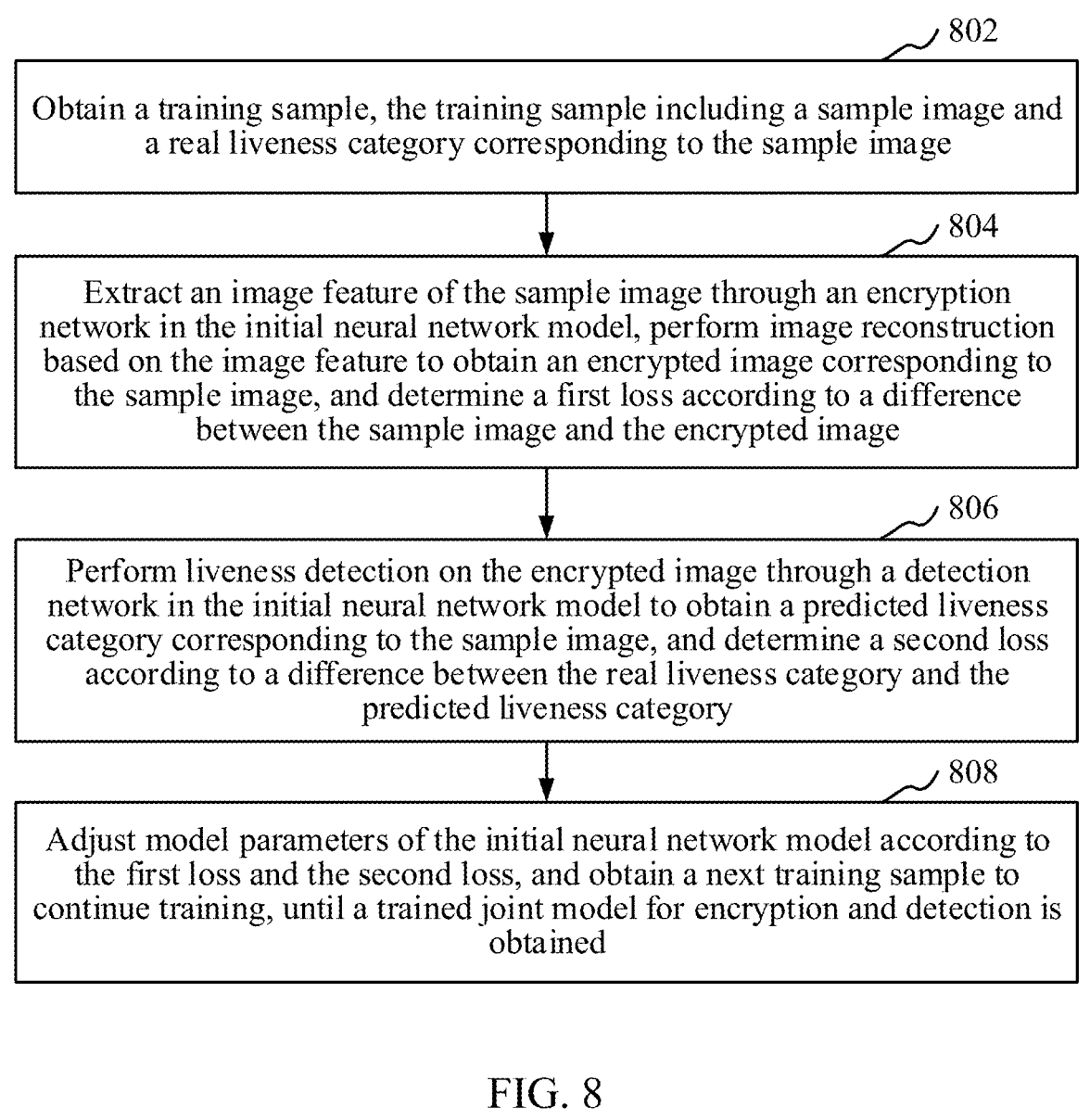

```
                                                            ┌─ 802
┌─────────────────────────────────────────────────────────────────┐
│  Obtain a training sample, the training sample including a sample  │
│  image and a real liveness category corresponding to the sample   │
│  image                                                            │
└─────────────────────────────────────────────────────────────────┘
                              │
                              ▼                             ┌─ 804
┌─────────────────────────────────────────────────────────────────┐
│    Extract an image feature of the sample image through an        │
│  encryption network in the initial neural network model, perform  │
│  image reconstruction based on the image feature to obtain an     │
│  encrypted image corresponding to the sample image, and determine │
│  a first loss according to a difference between the sample image  │
│  and the encrypted image                                          │
└─────────────────────────────────────────────────────────────────┘
                              │
                              ▼                             ┌─ 806
┌─────────────────────────────────────────────────────────────────┐
│    Perform liveness detection on the encrypted image through a    │
│  detection network in the initial neural network model to obtain  │
│  a predicted liveness category corresponding to the sample image, │
│  and determine a second loss according to a difference between    │
│  the real liveness category and the predicted liveness category   │
└─────────────────────────────────────────────────────────────────┘
                              │
                              ▼                             ┌─ 808
┌─────────────────────────────────────────────────────────────────┐
│  Adjust model parameters of the initial neural network model      │
│  according to the first loss and the second loss, and obtain a    │
│  next training sample to continue training, until a trained joint │
│  model for encryption and detection is obtained                   │
└─────────────────────────────────────────────────────────────────┘
```

FIG. 8

FACE LIVENESS DETECTION METHOD, SYSTEM, AND APPARATUS, COMPUTER DEVICE, AND STORAGE MEDIUM

RELATED APPLICATION

This application is a continuation application of PCT Patent Application No. PCT/CN2021/103452, filed on Jun. 30, 2021, which claims priority to Chinese Patent Application No. 202010815513.3, filed with the China National Intellectual Property Administration on Aug. 14, 2020, both of which are incorporated herein by reference in their entireties.

FIELD OF THE TECHNOLOGY

This application relates to the field of computer technologies, and in particular, to a face liveness detection method, system, and apparatus, a computer device, and a storage medium.

BACKGROUND OF THE DISCLOSURE

With the development of computer technologies, in order to more accurately and conveniently identify a user, a liveness detection technology has emerged. The liveness detection technology can be used to verify whether a user is a real living body and whether it is operated by himself/herself based on biometric information, which can effectively resist common attacks from photos, changing faces, masks, face occlusion, and the like.

At present, when a user is identified by using the liveness detection technology, it is usually necessary to obtain an original to-be-detected image and then perform liveness detection based on the to-be-detected image obtained. However, the to-be-detected image obtained belongs to the personal privacy of the user. With the increasingly widespread application of the liveness detection technology, how to avoid the leakage of personal privacy of the user caused by the theft of the to-be-detected image during the analysis and processing of liveness detection has become an urgent problem to be resolved.

SUMMARY

The present disclosure describes various embodiments for detecting a liveness of a face in an image.

The present disclosure describes a method for detecting a liveness of a face in an image. The method is performed by a computer device comprising a memory storing instructions and a processor in communication with the memory. The method includes obtaining an image comprising a face of an object; extracting an image feature of the image through an encryption network in a joint model for encryption and detection; performing image reconstruction based on the image feature to obtain an encrypted image corresponding to the image, the encrypted image being different in image content from the image; transmitting the encrypted image to a liveness detection server, wherein the liveness detection server is configured to perform liveness detection on the encrypted image through a detection network in the joint model for encryption and detection to obtain a liveness detection result of the object in the image; and receiving the liveness detection result of the object in the image from the liveness detection server.

In some implementations, for the above method, before the obtaining the image, the joint model for encryption and detection is trained by: obtaining a plurality of training samples, each training sample in the plurality of training samples comprising a sample image and a real liveness category corresponding to the sample image; and adjusting model parameters of an initial neural network model by using the plurality of training samples to obtain the joint model for encryption and detection.

In some implementations, for the above method, the adjusting model parameters of the initial neural network model by using the plurality of training samples to obtain the joint model for encryption and detection comprises: inputting a sample image and a real liveness category in a training sample to the initial neural network model; extracting a sample image feature of the sample image through an encryption network in the initial neural network model; performing image reconstruction based on the sample image feature to obtain an encrypted sample image corresponding to the sample image; determining a first loss according to a difference between the sample image and the encrypted sample image; performing liveness detection on the encrypted sample image through a detection network in the initial neural network model to obtain a predicted liveness category corresponding to the sample image; determining a second loss according to a difference between the real liveness category and the predicted liveness category; adjusting the model parameters of the initial neural network model according to the first loss and the second loss; and obtaining a next training sample in the plurality of training samples, and returning to the inputting a sample image and a real liveness category in a training sample to the initial neural network model to continue training, until the trained joint model for encryption and detection is obtained.

In some implementations, for the above method, the determining the first loss according to the difference between the sample image and the encrypted sample image comprises: obtaining an original feature value corresponding to each pixel in the sample image; obtaining an alternative feature value corresponding to each pixel in the encrypted sample image; and calculating the first loss according to a difference between the original feature value and the alternative feature value of each corresponding pixel.

In some implementations, for the above method, the adjusting the model parameters of the initial neural network model according to the first loss and the second loss comprises: constructing a target loss based on the first loss and the second loss; and adjusting the model parameters according to the target loss to increase the difference between the encrypted sample image outputted by the adjusted encryption network and the corresponding sample image, and reduce the difference between the predicted liveness category outputted by the adjusted detection network and the real liveness category.

In some implementations, for the above method, the obtaining the image comprises: obtaining a face image for identity verification; and the method further comprises: in a case that the liveness detection result indicates that a face in the face image is a living body, determining that the identity verification of the face image is successful.

In some implementations, for the above method, the method further comprises: performing data enhancement on the encrypted image to obtain a plurality of expanded images; and the liveness detection server is configured to perform liveness detection on the encrypted image through the detection network in the joint model for encryption and detection to obtain the liveness detection result of the object in the image by: performing liveness detection on each of the expanded images through the detection network in the joint model for encryption and detection to obtain a detection result corresponding to each of the expanded images; and determining the liveness detection result of the object in the image according to the detection result corresponding to each of the expanded images.

The present disclosure describes an apparatus for detecting a liveness of a face in an image. The apparatus includes a memory storing instructions; and a processor in communication with the memory. When the processor executes the instructions, the processor is configured to cause the apparatus to perform: obtaining an image comprising a face of an object; extracting an image feature of the image through an encryption network in a joint model for encryption and detection; performing image reconstruction based on the image feature to obtain an encrypted image corresponding to the image, the encrypted image being different in image content from the image; transmitting the encrypted image to a liveness detection server, wherein the liveness detection server is configured to perform liveness detection on the encrypted image through a detection network in the joint model for encryption and detection to obtain a liveness detection result of the object in the image; and receiving the liveness detection result of the object in the image from the liveness detection server.

The present disclosure describes a non-transitory computer-readable storage medium, storing computer-readable instructions. The computer-readable instructions, when executed by a processor, are configured to cause the processor to perform: obtaining an image comprising a face of an object; extracting an image feature of the image through an encryption network in a joint model for encryption and detection; performing image reconstruction based on the image feature to obtain an encrypted image corresponding to the image, the encrypted image being different in image content from the image; transmitting the encrypted image to a liveness detection server, wherein the liveness detection server is configured to perform liveness detection on the encrypted image through a detection network in the joint model for encryption and detection to obtain a liveness detection result of the object in the image; and receiving the liveness detection result of the object in the image from the liveness detection server.

In another embodiment, a face liveness detection method is provided, performed by a computer device. The method includes:

obtaining a to-be-detected image, the to-be-detected image being an image including a face of a to-be-detected object;

extracting an image feature of the to-be-detected image through an encryption network in a joint model for encryption and detection;

performing image reconstruction based on the image feature to obtain an encrypted image corresponding to the to-be-detected image, the encrypted image being an image that is different in image content from the to-be-detected image; and performing liveness detection on the encrypted image through a detection network in the joint model for encryption and detection to obtain a liveness detection result of the to-be-detected object in the to-be-detected image.

A face liveness detection method is provided, performed by a computer device. The method includes:

receiving an encrypted image transmitted by a terminal, the encrypted image being an image obtained by the terminal extracting an image feature of a to-be-detected image through an encryption network in a joint model for encryption and detection and performing image reconstruction based on the image feature, the encrypted image being an image that is different in image content from the to-be-detected image, and the to-be-detected image being an image including a face of a to-be-detected object;

performing liveness detection on the encrypted image through a detection network in the joint model for encryption and detection to obtain a liveness detection result of the to-be-detected object in the to-be-detected image; and returning the liveness detection result to the terminal.

A method for training a model is provided, performed by a computer device. The method includes:

obtaining a training sample, the training sample including a sample image and a real liveness category corresponding to the sample image;

extracting an image feature of the sample image through an encryption network in an initial neural network model, performing image reconstruction based on the image feature to obtain an encrypted image corresponding to the sample image, and determining a first loss according to a difference between the sample image and the encrypted image;

performing liveness detection on the encrypted image through a detection network in the initial neural network model to obtain a predicted liveness category corresponding to the sample image, and determining a second loss according to a difference between the real liveness category and the predicted liveness category; and adjusting model parameters of the initial neural network model according to the first loss and the second loss, and obtaining a next training sample to continue training, until a trained joint model for encryption and detection is obtained.

A face liveness detection system is provided, including a terminal and a liveness detection server.

The terminal is configured to obtain a to-be-detected image, the to-be-detected image being an image including a face of a to-be-detected object; the terminal is further configured to extract an image feature of the to-be-detected image through an encryption network in a joint model for encryption and detection; and perform image reconstruction based on the image feature to obtain an encrypted image corresponding to the to-be-detected image, the encrypted image being an image that is different in image content from the to-be-detected image; and the terminal is further configured to transmit the encrypted image to the liveness detection server;

the liveness detection server is configured to receive the encrypted image and perform liveness detection on the encrypted image through a detection network in the joint model for encryption and detection to obtain a liveness detection result of the to-be-detected object in the to-be-detected image; and the liveness detection server is further configured to return the liveness detection result to the terminal.

A face liveness detection apparatus is provided, including:

an obtaining module, configured to obtain a to-be-detected image, the to-be-detected image being an image including a face of a to-be-detected object; and a detection module, configured to extract an image feature of the to-be-detected image through an encryption network in a joint model for encryption and detection; perform image reconstruction based on the image feature to obtain an encrypted image corresponding to the to-be-detected image, the encrypted image being an image that is different in image content from the to-be-detected image; and perform liveness detection on the encrypted image through a detection network in the joint model for encryption and detection to obtain a liveness detection result of the to-be-detected object in the to-be-detected image.

A face liveness detection apparatus is provided, including:
a receiving module, configured to receive an encrypted image transmitted by a terminal, the encrypted image being an image obtained by the terminal extracting an image feature of a to-be-detected image through an encryption network in a joint model for encryption and detection and performing image reconstruction based on the image feature, the encrypted image being an image that is different in image content from the to-be-detected image, and the to-be-detected image being an image including a face of a to-be-detected object;
a liveness detection module, configured to perform liveness detection on the encrypted image through a detection network in the joint model for encryption and detection to obtain a liveness detection result of the to-be-detected object in the to-be-detected image; and
a transmission module, configured to return the liveness detection result to the terminal.

An apparatus for training a model is provided, including:
an obtaining module, configured to obtain a training sample, the training sample including a sample image and a real liveness category corresponding to the sample image;
a first loss determining module, configured to extract an image feature of the sample image through an encryption network in an initial neural network model, perform image reconstruction based on the image feature to obtain an encrypted image corresponding to the sample image, and determine a first loss according to a difference between the sample image and the encrypted image;
a second loss determining module, configured to perform liveness detection on the encrypted image through a detection network in the initial neural network model to obtain a predicted liveness category corresponding to the sample image, and determine a second loss according to a difference between the real liveness category and the predicted liveness category; and
an adjustment module, configured to adjust model parameters of the initial neural network model according to the first loss and the second loss, and obtain a next training sample to continue training, until a trained joint model for encryption and detection is obtained.

Provided is a computer device, including a memory and one or more processors, the memory storing a computer-readable instruction, the computer-readable instruction, when executed by the one or more processors, causing the one or more processors to perform the following steps:
obtaining a to-be-detected image, the to-be-detected image being an image including a face of a to-be-detected object;
extracting an image feature of the to-be-detected image through an encryption network in a joint model for encryption and detection;
performing image reconstruction based on the image feature to obtain an encrypted image corresponding to the to-be-detected image, the encrypted image being an image that is different in image content from the to-be-detected image; and
performing liveness detection on the encrypted image through a detection network in the joint model for encryption and detection to obtain a liveness detection result of the to-be-detected object in the to-be-detected image.

Provided is one or more non-volatile computer-readable storage media, storing a computer-readable instruction, the computer-readable instruction, when executed by one or more processors, causing the one or more processors to perform the following steps:
obtaining a to-be-detected image, the to-be-detected image being an image including a face of a to-be-detected object;
extracting an image feature of the to-be-detected image through an encryption network in a joint model for encryption and detection;
performing image reconstruction based on the image feature to obtain an encrypted image corresponding to the to-be-detected image, the encrypted image being an image that is different in image content from the to-be-detected image; and
performing liveness detection on the encrypted image through a detection network in the joint model for encryption and detection to obtain a liveness detection result of the to-be-detected object in the to-be-detected image.

In an embodiment, a computer program product or a computer program is provided. The computer program product or the computer program includes a computer instruction, and the computer instruction is stored in a computer-readable storage medium. A processor of a computer device reads the computer instruction from the computer-readable storage medium, and the processor executes the computer instruction, to cause the computer device to perform steps of the foregoing face liveness detection method and/or method for training a model.

BRIEF DESCRIPTION OF THE DRAWINGS

FIG. 5 is a schematic flowchart of a face liveness detection method according to another embodiment.

FIG. 7 is a schematic flowchart of a face liveness detection method according to still another embodiment.

FIG. 8 is a schematic flowchart of a method for training a model according to an embodiment.

DESCRIPTION OF EMBODIMENTS

To make objectives, technical solutions, and advantages of this application clearer and more comprehensible, this application is further described in detail with reference to the accompanying drawings and embodiments. It is to be understood that the specific embodiments described herein are only used for explaining this application, and are not used for limiting this application.

In a face liveness detection method and a method for training a model provided by this application, the liveness detection is achieved by using a computer vision technology and a machine learning technology in artificial intelligence (AI) technologies.

Figure 1:
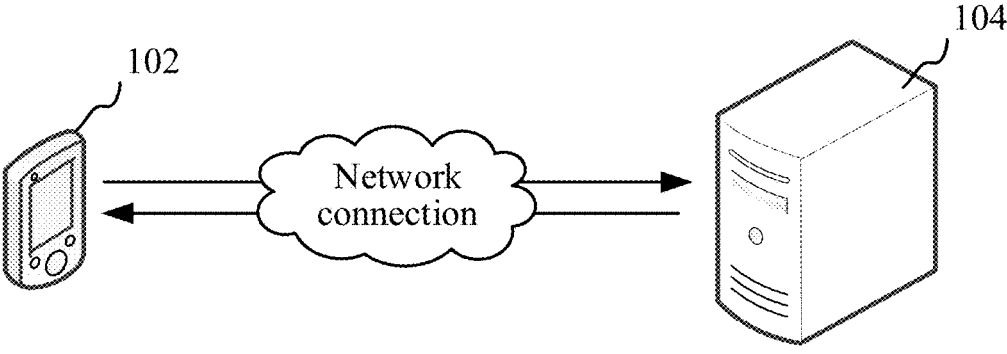
FIG. 1 is an application environment diagram of a face liveness detection method according to an embodiment.

The face liveness detection method provided in this application may be applied to an application environment shown in FIG. 1. A terminal 102 communicates with a liveness detection server 104 through a network. Specifically, the terminal 102 may obtain a to-be-detected image, extract an image feature of the to-be-detected image through an encryption network in a trained joint model for encryption and detection, perform image reconstruction based on the image feature to obtain an encrypted image corresponding to the to-be-detected image, and perform liveness detection on the encrypted image through a detection network in the joint model for encryption and detection to obtain a liveness detection result of the to-be-detected object in the to-be-detected image. In some implementations, the to-be-detected image may be referred as the image, and the to-be-detected object may be referred as the object.

In a conventional method, it is usually to use a whole human body as an object for liveness detection. A to-be-detected image includes a whole human body, and a biological feature of the human body in the image is extracted to perform the liveness detection on the whole human body. In the face liveness detection method provided in this application, a to-be-detected image is an image including a face of a to-be-detected object. The liveness detection is performed on the face part to obtain a liveness detection result for the face, so as to determine whether the face is a living body, which is the liveness detection based on a feature of the face part not the whole human body.

In some other embodiments, the encryption network and the detection network in the joint model for encryption and detection obtained by pre-training may be separately deployed. The encryption network is deployed on the terminal 102, and the detection network is deployed on the liveness detection server 104. In this case, the terminal 102 may obtain a to-be-detected image; extract an image feature of the to-be-detected image through the encryption network in the joint model for encryption and detection, perform image reconstruction based on the image feature to obtain an encrypted image corresponding to the to-be-detected image, and transmit the encrypted image to the liveness detection server; and the liveness detection server 104 may receive the encrypted image, perform liveness detection on the encrypted image through the detection network in the joint model for encryption and detection to obtain a liveness detection result of a to-be-detected object in the to-be-detected image, and return the liveness detection result to the terminal 102. In this embodiment, the terminal does not need to transmit the original to-be-detected image to the liveness detection server through a network, avoiding the risk of leakage of user privacy caused by the theft of the to-be-detected image during network transmission. In addition, the liveness detection server also does not need to directly detect the original to-be-detected image, avoiding the risk of the to-be-detected image being stolen or misappropriated during liveness detection, and protecting the personal privacy of the user.

In the present disclosure, the transmission of the image to the liveness detection server include the encrypted image rather than the original image, thus avoiding the exposure of the original image during transmission; and/or the liveness detection server uses the encrypted image and does not directly use the original image, thus avoiding the exposure of the original image during liveness detection. Therefore, the present disclosure at least enhances the security and/or protects the privacy, improving the technology field of network security and privacy protection.

The terminal 102 may be, but is not limited to, a personal computer, a notebook computer, a smartphone, a tablet computer, and a portable wearable device. The liveness detection server 104 may be implemented by an independent server or a server cluster including a plurality of servers.

In an embodiment, a joint model for encryption and detection based on an artificial neural network may be obtained by training using a computer device. The computer device may obtain each training sample in a plurality of training samples, each training sample including a sample image and a real liveness category corresponding to the sample image; extract an image feature of the sample image through an encryption network in an initial neural network model, perform image reconstruction based on the image feature to obtain an encrypted image corresponding to the sample image, and determine a first loss according to a difference between the sample image and the encrypted image; perform liveness detection on the encrypted image through a detection network in the initial neural network model to obtain a predicted liveness category corresponding to the sample image, and determine a second loss according to a difference between the real liveness category and the predicted liveness category; and adjust model parameters of the initial neural network model according to the first loss and the second loss, and return to the step of obtaining each training sample in a plurality of training samples to continue training, until a trained joint model for encryption and detection is obtained. The computer device used for training of the joint model for encryption and detection may be a terminal or a server.

In a specific application scenario, when there is a need to perform identity verification on a user, a face verification device may collect a face image of the user, extract an image feature of a to-be-detected image through an encryption network in a joint model for encryption and detection, and perform image reconstruction based on the image feature to obtain an encrypted image. There is a very large difference in vision between the encrypted image and the face image, so that the specific content of the original face image cannot be obtained through the encrypted image. The face verification device then transmits the encrypted image to a liveness detection server. After receiving the encrypted image, the liveness detection server performs liveness detection on the encrypted image through a detection network in the joint model for encryption and detection to obtain a detection result, and determines whether the identity verification of the user is successful according to the detection result. The face verification device may be a mobile phone, a face verification machine, or other devices with an image collection apparatus.

In the face liveness detection method provided in the embodiments of this application, the encryption network and the detection network in the joint model for encryption and detection based on a neural network are obtained by joint training. The encryption network can ensure that there is a certain difference between the to-be-detected image and the encrypted image, and the detection network can ensure the accuracy of liveness detection on the encrypted image, so that the joint model for encryption and detection has the capability of performing liveness detection while encrypting the to-be-detected image. In this case, after the to-be-detected image is obtained, the image feature of the to-be-detected image is extracted through the encryption network in the joint model for encryption and detection obtained by pre-training, and image reconstruction is performed based on the image feature to obtain the encrypted image that is different from the original to-be-detected image, so that the content of the original to-be-detected image cannot be obtained through the encrypted image. Subsequently, the liveness detection is performed based on the encrypted image through the detection network in the joint model for encryption and detection, which does not need to directly analyze the original to-be-detected image and can reduce the risk of leakage of user privacy caused by the theft of the to-be-detected image during liveness detection, protecting the personal privacy of the user. In addition, the liveness detection is performed on the encrypted image through the detection network in the joint model for encryption and detection, which can ensure the accuracy of liveness detection.

Figure 2:
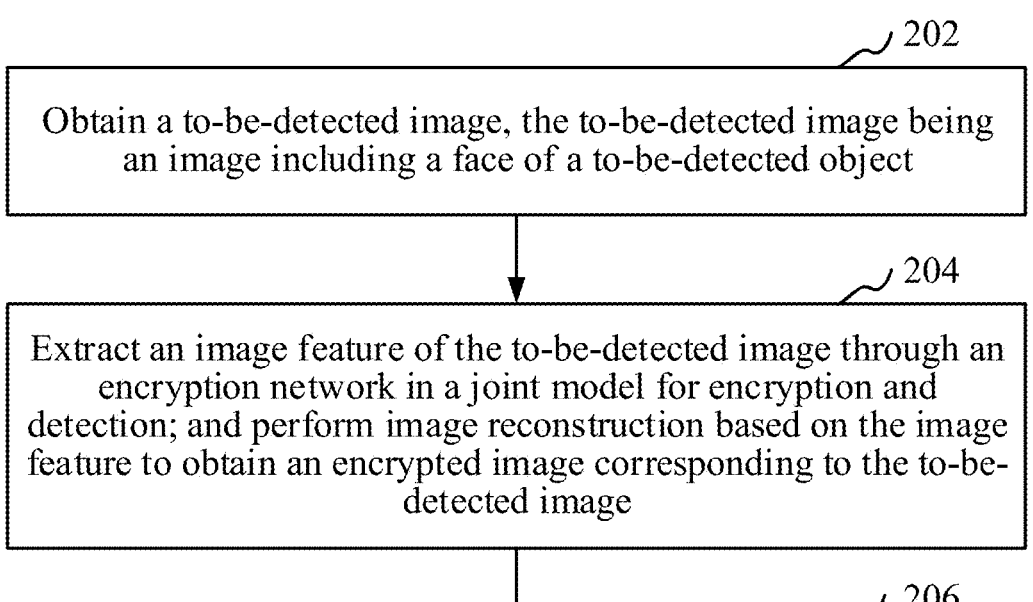
FIG. 2 is a schematic flowchart of a face liveness detection method according to an embodiment.

In an embodiment, as shown in FIG. 2, a face liveness detection method is provided. Using the method applied to the terminal 102 in FIG. 1 as an example for description, the method includes the following steps:

Step 202. Obtain a to-be-detected image, the to-be-detected image being an image including a face of a to-be-detected object.

The to-be-detected image is an image to be subjected to liveness detection. The to-be-detected image includes a face of a to-be-detected object. Liveness detection is a method of identifying whether an image includes a real living body and whether it is operated by a user himself/herself according to a biological feature in the image. It is usually used to determine whether an image includes a real user, and is often used in an identity verification scenario, which can effectively resist photo attacks. It may be understood that the to-be-detected image may be a face image or may be an image including a face and a gesture or an expression.

Specifically, the terminal may collect an image in real time through a local image collection apparatus and use the image collected as a to-be-detected image, for example, a face image of a user collected by the terminal 102 in FIG. 1 through a camera. The to-be-detected image may alternatively be an image exported by the terminal from the local. The image exported from the local may be a pre-taken photo or a stored photo, but it may be understood that the image exported from the local usually fails in the verification of liveness detection.

Step 204. Extract an image feature of the to-be-detected image through an encryption network in a joint model for encryption and detection; and perform image reconstruction based on the image feature to obtain an encrypted image corresponding to the to-be-detected image.

The encrypted image is an image that is different in image content from the to-be-detected image. The encrypted image carries identification information for liveness detection.

Step 206. Perform liveness detection on the encrypted image through a detection network in the joint model for encryption and detection to obtain a liveness detection result of the to-be-detected object in the to-be-detected image.

The joint model for encryption and detection is a machine learning model has the capability of performing encryption and liveness detection on an image through learning by a computer device based on a plurality of training samples. The computer device used for training may be a terminal or a server. In this embodiment, a terminal is used as a training device for description. The joint model for encryption and detection may be implemented by a neural network model, for example, a convolutional neural network model. In an embodiment, the terminal may set a model structure of a neural network model in advance to obtain an initial neural network model, and then train the initial neural network model through sample images with real liveness categories (including living body and non-living body) marked (the specific steps of training will be described below) to obtain trained model parameters. In this case, when there is a need to perform liveness detection on the to-be-detected image, the terminal may obtain the pre-trained model parameters and import the model parameters into an initial neural network model to obtain a joint model for encryption and detection.

In this embodiment, the joint model for encryption and detection includes an encryption network and a detection network. Both the encryption network and the detection network may be a network structure implemented based on a convolutional neural network. The encryption network is used to encrypt an original to-be-detected image to obtain an encrypted image corresponding to the to-be-detected image. The detection network is used to perform liveness detection on the encrypted image to obtain a liveness detection result of a to-be-detected object in the to-be-detected image. The detection result is one of success and failure in liveness detection of the to-be-detected image. If the liveness detection of the to-be-detected image is successful, it indicates that the to-be-detected image includes a real living body. If the liveness detection of the to-be-detected image fails, it indicates that the to-be-detected image does not include a real living body.

The neural network structure inside the encryption network and the detection network is not limited in the embodiments of this application. A designer may set according to actual needs, as long as the encryption network can implement encryption and the obtained encrypted image is quite different from the original to-be-detected image, and the detection network can perform liveness detection on the encrypted image. For example, in an embodiment, an encryption network includes an input layer, an encoding layer, a decoding layer, and an output layer. The inputted to-be-detected image may be inputted to the encryption network through the input layer, an image feature of the to-be-detected image may be extracted through the encoding layer, and image reconstruction may be performed based on the image feature through the decoding layer, to obtain an encrypted image corresponding to the to-be-detected image. The encoding layer may include a plurality of convolutional layers to perform a plurality of times of convolution processing on the inputted to-be-detected image to obtain the image feature. The decoding layer may include a plurality of deconvolutional layers to perform a plurality of times of deconvolution processing on the image feature to obtain the encrypted image. After the encryption by the encryption network, there is a large difference between the encrypted image outputted by the encryption network and the originally inputted to-be-detected image, so that the problem of leakage of user privacy during liveness detection on the encrypted image subsequently can be avoided.

In the field of image encryption, an image is usually encrypted by using some specific encryption algorithms (for example, the Hash algorithm). However, after an image is encrypted through these algorithms, the distinguishability of the original image will be destroyed, and the encrypted image cannot be directly subjected to liveness detection. For example, when the terminal encrypts the image by using these algorithms and then transmits it to the server, the server also needs to first perform decryption by using a corresponding decryption method to obtain the original image and then perform liveness detection, so that the original image will still be exposed during the detection, which is not conducive to protecting the user privacy. However, in this embodiment, the to-be-detected image is encrypted through the encryption network based on a neural network to obtain the encrypted image. The encrypted image is quite different from the original image, eliminating the private information of the user, which will not directly expose the user information to the detection server. In addition, the encrypted image also carries identification information necessary for liveness detection, so that the liveness detection server may directly perform liveness detection on the encrypted image to obtain the liveness detection result, thereby truly protecting the user privacy.

Moreover, in the related art, the image obtained by performing image reconstruction based on the image feature of the original image is usually an image that differs very little from the original image to restore it to the original image as much as possible, so the difference between the reconstructed image and the original image needs to be as small as possible. However, in the embodiments of this application, although the encrypted image outputted by the encryption network in the joint model for encryption and detection is also obtained by performing image reconstruction based on the image feature, the outputted encrypted image is quite different from the original to-be-detected image in content or visual presentation since the first loss adjusts the encryption network in the model in a direction that increases the difference between the inputted image and the encrypted image during model training, so as to be as difficult to be recognized or cracked as possible, achieving the effect of protecting the user privacy. In addition, the encrypted image also retains the necessary information for liveness detection. In some implementations, during training of encryption network, parameters in the encryption network are adjusted to increase the difference between the inputted image and the encrypted image.

Figure 3:
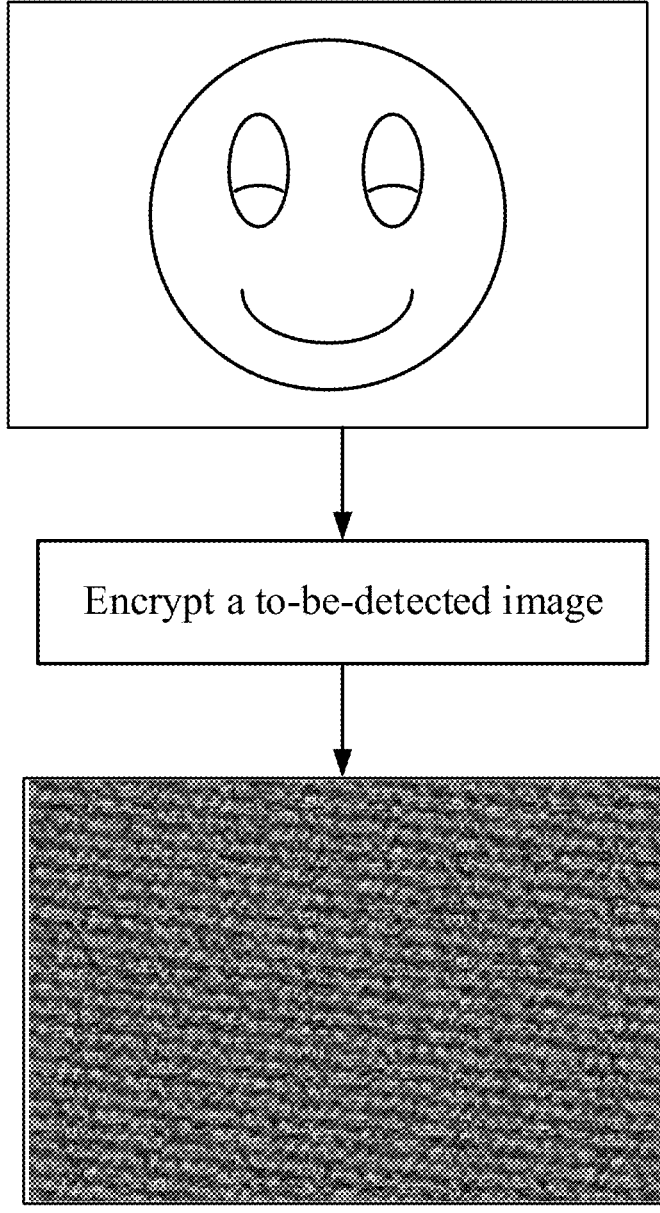
FIG. 3 is a schematic diagram of encrypting a face image to obtain an encrypted image according to an embodiment.

In some embodiments, the encrypted image may be an image file having a visual form, for example, an image file in a JPEG format. The encrypted image may alternatively be image data without a visual form, for example, a set of pixel values for each pixel represented by a numerical value. FIG. 3 is a schematic diagram of encrypting a face image to obtain an encrypted image according to an embodiment. Referring to FIG. 3, the encrypted image obtained through encryption is completely different from the original face image visually, and the content of the original face image cannot be obtained from the encrypted image.

Figure 4:
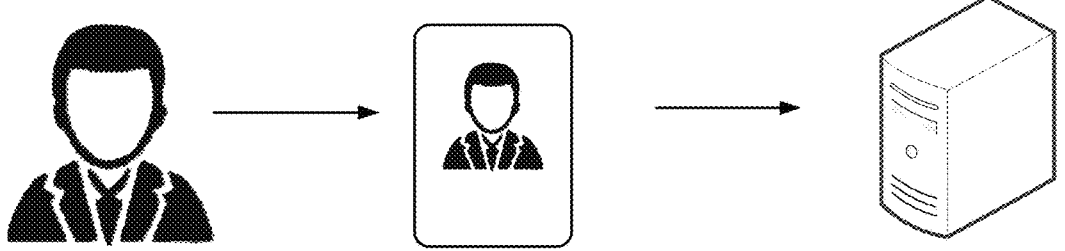
FIG. 4 is a schematic architectural diagram of separately deploying an encryption network and a detection network according to an embodiment.

In some embodiments, step 204 and step 206 may be independently performed by a terminal, for example, independently performed by a face verification device. Alternatively, step 204 and step 206 may be respectively performed by a plurality of computer devices. FIG. 4 is a schematic architectural diagram of separately deploying an encryption network and a detection network according to an embodiment. Referring to FIG. 4, a face verification device obtains a to-be-detected image of a user, encrypts the to-be-detected image through an encryption network in a trained joint model for encryption and detection to obtain an encrypted image corresponding to the to-be-detected image, and transmits the encrypted image to a liveness detection server; and the liveness detection server receives the encrypted image transmitted by the face verification device, and performs liveness detection on the encrypted image through a detection network in the joint model for encryption and detection to obtain a liveness detection result of a to-be-detected object in the to-be-detected image. Because the liveness detection server does not directly process the original to-be-detected image but analyzes the encrypted image, the security of the to-be-detected image during network transmission can be ensured, and the to-be-detected image can be prevented from being directly analyzed by the liveness detection server to expose the user privacy.

The liveness detection result includes one of success and failure in liveness detection of the to-be-detected image. A computer device may determine whether the to-be-detected object in the to-be-detected image is a living body according to the liveness detection result. In some application scenarios of identity verification, the to-be-detected image is a face image. When a terminal determines that a face in the face image is a living body, it is determined that the identity verification of the current user is successful, so the user is allowed to perform a corresponding operation, for example, to log in by using the current user account or to pay by using the current user account.

For a non-limiting example, a terminal may be disposed at a gate/door to a secured area. When the terminal determines that a face in the face image is a living body, it is determined that the identity verification of the current user is successful, so a signal is transmitted to unlock the lock and/or open the gate/door.

In the foregoing face liveness detection method, the encryption network and the detection network in the joint model for encryption and detection based on a neural network are obtained by joint training. The encryption network can ensure that there is a certain difference between the to-be-detected image and the encrypted image, and the detection network can ensure the accuracy of liveness detection on the encrypted image, so that the joint model for encryption and detection has the capability of performing liveness detection while encrypting the to-be-detected image. In this case, after the to-be-detected image is obtained, the image feature of the to-be-detected image is extracted through the encryption network in the joint model for encryption and detection that is trained (or referred as pre-trained) by one of various implementations described in the present disclosure, and image reconstruction is performed based on the image feature to obtain the encrypted image that is different from the original to-be-detected image, so that the content of the original to-be-detected image cannot be obtained through the encrypted image. Subsequently, the liveness detection is performed based on the encrypted image through the detection network in the joint model for encryption and detection, which does not need to directly analyze the original to-be-detected image and can reduce the risk of leakage of user privacy caused by the theft of the to-be-detected image during liveness detection, protecting the personal privacy of the user. In addition, the liveness detection is performed on the encrypted image through the detection network in the joint model for encryption and detection, which can ensure the accuracy of liveness detection.

In an embodiment, before step 202, the foregoing face liveness detection method further includes steps of training (or pre-training) a model, specifically including: obtaining a plurality of training samples; and adjusting model parameters of an initial neural network model by using the plurality of training samples to obtain a joint model for encryption and detection.

As mentioned above, the initial neural network model is a pre-set model structure. It may be understood that the model parameters of the initial neural network model are initial model parameters. The initial model parameters are updated through continuous training to obtain trained model parameters. The trained model parameters are imported into the initial neural network model to obtain the joint model for encryption and detection having the capability of image encryption and liveness detection.

Specifically, a terminal may obtain a plurality of training samples and adjust model parameters of an initial neural network model by using the plurality of training samples. Each training sample of the plurality of training samples includes a sample image and a real liveness category corresponding to the sample image. The real liveness category is a real and accurate liveness classification label corresponding to the sample image. The liveness classification label includes one of an object in the sample image being a living body or an object in the sample image being a non-living body. During model training, each sample image and its corresponding real liveness category are sequentially inputted to an initial neural network model for processing, model parameters are adjusted according to a processing result outputted by the current model, and then a next sample image is processed based on the adjusted model parameters, repeating the process, until a trained joint model for encryption and detection is obtained.

In an embodiment, as shown in FIG. 5, the face liveness detection method further includes step 502 to step 508 of adjusting model parameters of an initial neural network model by using training samples to obtain a joint model for encryption and detection.

Step 502. Input a sample image and a real liveness category in a training sample to an initial neural network model.

Step 504. Extract an image feature of the sample image through an encryption network in the initial neural network model, perform image reconstruction based on the image feature to obtain an encrypted image corresponding to the sample image, and determine a first loss according to a difference between the sample image and the encrypted image.

In an embodiment, a terminal may calculate a squared error loss between the sample image and the encrypted image as the first loss.

In an embodiment, the determining a first loss according to a difference between the sample image and the encrypted image includes: obtaining an original feature value corresponding to each pixel in the sample image; obtaining an alternative feature value corresponding to each pixel in the encrypted image; and calculating the first loss according to a difference between the original feature value and the alternative feature value of a same pixel (or each corresponding pixel).

It may be understood that the essence of the encryption is to transform the original feature value of each pixel in the original to-be-detected image to replace the original feature value with another feature value. The another feature value may be referred to as the alternative feature value.

Specifically, a terminal may obtain the original feature value corresponding to each pixel in the sample image and the alternative feature value corresponding to each pixel in the corresponding encrypted image, and calculate the first loss according to a difference between the original feature value and the alternative feature value of the same pixel. The same pixel herein refers to pixels with the same pixel coordinates. For example, a pixel at (x,y) in the sample image is the same as a pixel at (x,y) in the corresponding encrypted image. If the original feature value of the pixel at (x,y) in the sample image is m, and the alternative feature value of the pixel at (x,y) in the encrypted image is n, the first loss loss1 may be expressed as $$\sum_{(x,y)} \frac{1}{2}(m - n)^2.$$

Step 506. Perform liveness detection on the encrypted image through a detection network in the initial neural network model to obtain a predicted liveness category corresponding to the sample image, and determine a second loss according to a difference between the real liveness category and the predicted liveness category.

In an embodiment, a terminal may calculate a squared error loss between the real liveness category and the predicted liveness category of the sample image as the second loss.

The liveness category of an image includes a living body and a non-living body, and may be represented by a probability p of belonging to a living body. When p is greater than a preset threshold, it is determined to belong to a living body, which may be recorded as 1. When p is less than the preset threshold, it is determined to belong to a non-living body, which may be recorded as 0. The terminal may obtain the real liveness category s (s=0 or 1) of the sample image and the predicted liveness category p obtained by performing liveness detection through the detection network, and determine the second loss based on the difference between the real liveness category s and the predicted liveness category p. The second loss loss2 may be expressed as $$\frac{1}{2}(s - p)^2.$$

Step 508. Adjust model parameters of the initial neural network model according to the first loss and the second loss, and obtain a next training sample to continue training, until a trained joint model for encryption and detection is obtained.

The first loss is used to adjust the model in a direction that increases the difference between the sample image and the encrypted image, and the sample second loss is used to adjust the model in a direction that reduces the difference between the real liveness category and the predicted liveness category. In this case, it can be ensured that the joint model for encryption and detection obtained by training has the capability of encrypting the to-be-detected image while the accuracy of liveness detection on the to-be-detected image can be ensured.

Specifically, after obtaining the first loss and the second loss, a terminal may adjust the model parameters by using a stochastic gradient descent algorithm in a direction that increases the first loss and reduces the second loss. In this case, after multiple adjustments, the joint model for encryption and detection that can differentiate the original to-be-detected image from the encrypted image and can accurately perform liveness detection can be obtained.

In some implementations, during training with stochastic gradient descent algorithms, one of the goals is to increase the first loss; and another of the training goals is to decrease the second loss.

In an embodiment, the adjusting the model parameters of the initial neural network model according to the first loss and the second loss includes: constructing a target loss based on the first loss and the second loss; and adjusting the model parameters according to the target loss to increase the difference between the encrypted image outputted by the adjusted encryption network and the original sample image, and reduce the difference between the predicted liveness category outputted by the adjusted detection network and the real liveness category.

Specifically, a terminal may update the model parameters by minimizing the target loss. In this case, the constructed target loss is negatively correlated with the first loss and positively correlated with the second loss. For example, the target loss is equal to the second loss minus the first loss.

It may be understood that a terminal may alternatively update the model parameters by maximizing the target loss. In this case, the constructed target loss is positively correlated with the first loss and negatively correlated with the second loss. For example, the target loss is equal to the first loss minus the second loss.

Figure 6:
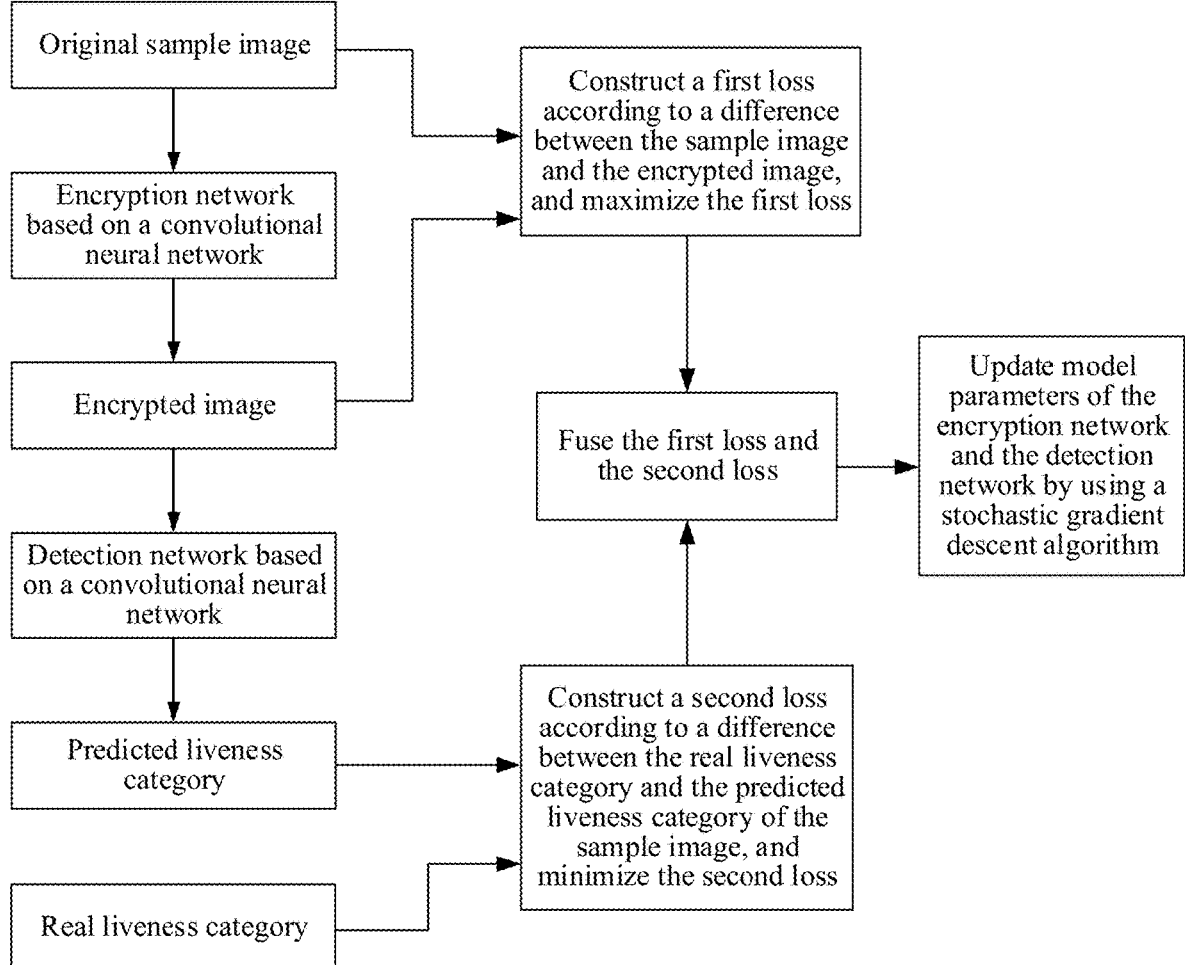
FIG. 6 is a framework diagram of training a joint model for encryption and detection according to an embodiment.

FIG. 6 is a framework diagram of training a model that combines an encryption network and a detection network according to an embodiment. Referring to FIG. 6, an encryption network implemented based on a convolutional neural network encrypts an original sample image and outputs an encrypted image corresponding to the sample image; next, a first loss is constructed according to a difference between the sample image and the encrypted image, and a target of training is to maximize the first loss to make the difference between the original sample image and the corresponding encrypted image larger and larger; then, the obtained encrypted image is inputted to a detection network implemented based on a convolutional neural network and is subjected to liveness detection through the detection network, to output a predicted liveness category corresponding to the sample image; subsequently, a second loss is constructed according to a difference between a real liveness category and the predicted liveness category of the sample image, and the second loss needs to be minimized during training to ensure the accuracy of liveness detection; and finally, after the first loss and the second loss are fused, the model parameters of the encryption network and the detection network are updated by using a stochastic gradient descent algorithm until a joint model for encryption and detection that combines encryption and detection is obtained. The liveness detection is performed while the image is encrypted, which not only ensures that the image content is not leaked, but also completes the liveness detection.

In this embodiment, the designed initial neural network model includes the encryption network and the detection network. The encryption network and the detection network are jointly trained, so that the joint model for encryption and detection obtained by training has the capability of performing encryption and liveness detection on the image, which not only ensures that the image content is not leaked, but also completes the liveness detection.

In an embodiment, the foregoing face liveness detection method further includes:

performing data enhancement on the encrypted image to obtain a plurality of expanded images; and the performing liveness detection on the encrypted image through a detection network in the joint model for encryption and detection to obtain a liveness detection result of the to-be-detected object in the to-be-detected image including: performing liveness detection on each of the expanded images through the detection network in the joint model for encryption and detection to obtain a liveness detection result corresponding to each of the expanded images; and determining the detection result of the to-be-detected object in the to-be-detected image according to the liveness detection result corresponding to each of the expanded images.

The data enhancement on the encrypted image may be at least one of Gaussian noise processing, random flipping, random cropping, and random erasing on the encrypted image. A plurality of expanded images may be obtained by performing data enhancement on the encrypted image. That is, the plurality of expanded images may be obtained based on only one to-be-detected image. Each expanded image is then subjected to liveness detection to obtain a detection result. Finally, the detection result may be voted according to a preset voting method to determine whether a to-be-detected object in the to-be-detected image is a living body, thereby increasing the accuracy of liveness detection.

In an embodiment, a terminal may transmit an encrypted image to a liveness detection server, the liveness detection server receives the encrypted image and performs data enhancement on the encrypted image to obtain a plurality of expanded images, and each expanded image is subjected to liveness detection through a detection network in a joint model for encryption and detection to obtain a liveness detection result corresponding to each expanded image. In this case, the network transmission delay caused by the terminal generating a plurality of to-be-detected images and transmitting the to-be-detected images to the liveness detection server through a network for liveness detection can be avoided, improving user experience.

In an embodiment, as shown in FIG. 7, a face liveness detection method is provided. Using the method applied to the liveness detection server 104 in FIG. 1 as an example for description, the method includes the following steps:

Step 702. Receive an encrypted image transmitted by a terminal, the encrypted image being an image obtained by the terminal extracting an image feature of a to-be-detected image through an encryption network in a trained joint model for encryption and detection and performing image reconstruction based on the image feature.

The to-be-detected image is an image to be subjected to liveness detection. Liveness detection is a method of identifying whether an image includes a real living body and whether it is operated by a user himself/herself according to a biological feature in the image. It is usually used to determine whether an image includes a real user, and is often used in an identity verification scenario, which can effectively resist photo attacks. It may be understood that the to-be-detected image may be a face image or may be an image including a face and a gesture or an expression.

Specifically, the terminal may collect an image in real time through a local image collection apparatus and use the image collected as a to-be-detected image, for example, a face image of a user collected by the terminal 102 in FIG. 1 through a camera. The to-be-detected image may alternatively be an image exported by the terminal from the local.

The image exported from the local may be a pre-taken photo or a stored photo, but it may be understood that the image exported from the local usually fails in the verification of liveness detection.

The joint model for encryption and detection is a machine learning model has the capability of performing encryption and liveness detection on an image through learning by a computer device based on a plurality of training samples. The computer device used for training may be a terminal or a server. The joint model for encryption and detection may be implemented by a neural network model, for example, a convolutional neural network model. In an embodiment, the computer device may set a model structure of a neural network model in advance to obtain an initial neural network model, and then train the initial neural network model through sample images with real liveness categories (including living body and non-living body) marked (the specific steps of training will be described below) to obtain trained model parameters. In this case, when there is a need to perform liveness detection on the to-be-detected image, the terminal or the liveness detection server may obtain the pre-trained model parameters and import the model parameters into an initial neural network model to obtain a joint model for encryption and detection.

In this embodiment, the joint model for encryption and detection includes an encryption network and a detection network. Both the encryption network and the detection network may be a network structure implemented based on a convolutional neural network. The encryption network is used to encrypt an original to-be-detected image to obtain an encrypted image corresponding to the to-be-detected image. The detection network is used to perform liveness detection on the encrypted image to obtain a liveness detection result of a to-be-detected object in the to-be-detected image. The detection result is one of success and failure in liveness detection of the to-be-detected image. If the liveness detection of the to-be-detected image is successful, it indicates that the to-be-detected image includes a real living body. If the liveness detection of the to-be-detected image fails, it indicates that the to-be-detected image does not include a real living body.

The terminal may extract the image feature of the to-be-detected image through the encryption network in the joint model for encryption and detection, perform image reconstruction based on the image feature to obtain the encrypted image corresponding to the to-be-detected image, and transmit the encrypted image to the liveness detection server. The liveness detection server receives the encrypted image. The encrypted image is an image that is different in image content from the to-be-detected image. The encrypted image carries identification information for liveness detection.

In some embodiments, the encrypted image may be an image file having a visual form, for example, an image file in a JPEG format. The encrypted image may alternatively be image data without a visual form, for example, a set of pixel values for each pixel represented by a numerical value.

Step 704. Perform liveness detection on the encrypted image through a detection network in the joint model for encryption and detection to obtain a liveness detection result of the to-be-detected object in the to-be-detected image.

Step 706. Return the liveness detection result to the terminal.

The liveness detection result includes one of success and failure in liveness detection of the to-be-detected image. After receiving the encrypted image transmitted by the terminal, the liveness detection server performs liveness detection on the encrypted image through the detection network in the joint model for encryption and detection, and returns the obtained liveness detection result of the to-be-detected object in the to-be-detected image to the terminal.

In some application scenarios of identity verification, when a liveness detection server determines that a to-be-detected object in a to-be-detected image is a living body, it is determined that the identity verification of the current user is successful, so it is fed back to the terminal to allow the user to perform a corresponding operation, for example, to log in by using the current user account or to pay by using the current user account.

In an embodiment, a liveness detection server may also perform data enhancement on an encrypted image to obtain a plurality of expanded images; perform liveness detection on each expanded image through a detection network in a joint model for encryption and detection to obtain a liveness detection result corresponding to each expanded image; and determine a liveness detection result of a to-be-detected object in a to-be-detected image according to the detection result corresponding to each expanded image. In this case, the network transmission delay caused by the terminal generating a plurality of to-be-detected images and transmitting the to-be-detected images to the liveness detection server through a network for liveness detection can be avoided, improving user experience.

In the foregoing face liveness detection method, the encryption network and the detection network in the joint model for encryption and detection based on a neural network are obtained by joint training. The encryption network can ensure that there is a certain difference between the to-be-detected image and the encrypted image, and the detection network can ensure the accuracy of liveness detection on the encrypted image, so that the joint model for encryption and detection has the capability of performing liveness detection while encrypting the to-be-detected image. In this case, after the to-be-detected image is obtained, the image feature of the to-be-detected image is extracted through the encryption network in the joint model for encryption and detection obtained by pre-training, and image reconstruction is performed based on the image feature to obtain the encrypted image that is different from the original to-be-detected image, so that the content of the original to-be-detected image cannot be obtained through the encrypted image. Subsequently, the liveness detection is performed based on the encrypted image through the detection network in the joint model for encryption and detection, which does not need to directly analyze the original to-be-detected image and can reduce the risk of leakage of user privacy caused by the theft of the to-be-detected image during liveness detection, protecting the personal privacy of the user. In addition, the liveness detection is performed on the encrypted image through the detection network in the joint model for encryption and detection, which can ensure the accuracy of liveness detection.

In an embodiment, as shown in FIG. 8, a method for training a model is provided. Using the method applied to a computer device as an example, the method includes the following steps:

Step 802. Obtain a training sample, the training sample including a sample image and a real liveness category corresponding to the sample image.

Specifically, the computer device may set a model structure of a neural network model in advance to obtain an initial neural network model. The computer device may obtain a plurality of training samples and adjust model parameters of the initial neural network model by using the plurality of training samples. It may be understood that the model parameters of the initial neural network model are initial model parameters. The initial model parameters are updated through continuous training to obtain trained model parameters.

Each training sample of the plurality of training samples obtained by the computer device includes a sample image and a real liveness category corresponding to the sample image. The real liveness category is a real and accurate liveness classification label corresponding to the sample image. The liveness classification label includes one of an object in the sample image being a living body or an object in the sample image being a non-living body. During model training, each sample image and its corresponding real liveness category are sequentially inputted to the initial neural network model for processing.

Step 804. Extract an image feature of the sample image through an encryption network in the initial neural network model, perform image reconstruction based on the image feature to obtain an encrypted image corresponding to the sample image, and determine a first loss according to a difference between the sample image and the encrypted image.

In an embodiment, a computer device may calculate a squared error loss between the sample image and the encrypted image as the first loss.

In an embodiment, the determining a first loss according to a difference between the sample image and the encrypted image includes: obtaining an original feature value corresponding to each pixel in the sample image; obtaining an alternative feature value corresponding to each pixel in the encrypted image; and calculating the first loss according to a difference between the original feature value and the alternative feature value of a same pixel.

It may be understood that the essence of the encryption is to transform the original feature value of each pixel in the original to-be-detected image to replace the original feature value with another feature value. The another feature value may be referred to as the alternative feature value.

Specifically, a computer device may obtain the original feature value corresponding to each pixel in the sample image and the alternative feature value corresponding to each pixel in the corresponding encrypted image, and calculate the first loss according to a difference between the original feature value and the alternative feature value of the same pixel. The same pixel herein refers to pixels with the same pixel coordinates. For example, a pixel at (x,y) in the sample image is the same as a pixel at (x,y) in the corresponding encrypted image. If the original feature value of the pixel at (x,y) in the sample image is m, and the alternative feature value of the pixel at (x,y) in the encrypted image is n, the first loss loss1 may be expressed as D $$\sum_{(x,y)} \frac{1}{2}(m-n)^2.$$

Step 806. Perform liveness detection on the encrypted image through a detection network in the initial neural network model to obtain a predicted liveness category corresponding to the sample image, and determine a second loss according to a difference between the real liveness category and the predicted liveness category.

In an embodiment, a computer device may calculate a squared error loss between the real liveness category and the predicted liveness category of the sample image as the second loss.

The liveness category of an image includes a living body and a non-living body, and may be represented by a probability p of belonging to a living body. When p is greater than a preset threshold, it is determined to belong to a living body, which may be recorded as 1. When p is less than the preset threshold, it is determined to belong to a non-living body, which may be recorded as 0. The terminal may obtain the real liveness category s (s=0 or 1) of the sample image and the predicted liveness category p obtained by performing liveness detection through the detection network, and determine the second loss based on the difference between the real liveness category s and the predicted liveness category p. The second loss loss2 may be expressed as $$\frac{1}{2}(s-p)^2.$$

Step 808. Adjust model parameters of the initial neural network model according to the first loss and the second loss, and obtain a next training sample to continue training, until a trained joint model for encryption and detection is obtained.

The first loss is used to adjust the model in a direction that increases the difference between the sample image and the encrypted image, and the sample second loss is used to adjust the model in a direction that reduces the difference between the real liveness category and the predicted liveness category. In this case, it can be ensured that the joint model for encryption and detection obtained by training has the capability of encrypting the to-be-detected image while the accuracy of liveness detection on the to-be-detected image can be ensured.

Specifically, after obtaining the first loss and the second loss, a computer device may adjust the model parameters by using a stochastic gradient descent algorithm in a direction that increases a difference between the encrypted image and the original sample image and reduces a difference between the predicted liveness category and the real liveness category. In this case, after multiple adjustments, the joint model for encryption and detection that can differentiate the original to-be-detected image from the encrypted image and can accurately perform liveness detection can be obtained.

In an embodiment, the adjusting the model parameters of the initial neural network model according to the first loss and the second loss includes: constructing a target loss based on the first loss and the second loss; and adjusting the model parameters according to the target loss to increase the difference between the encrypted image outputted by the adjusted encryption network and the original sample image, and reduce the difference between the predicted liveness category outputted by the adjusted detection network and the real liveness category.

Specifically, a computer device may update the model parameters by minimizing the target loss. In this case, the constructed target loss is negatively correlated with the first loss and positively correlated with the second loss. For example, the target loss is equal to the second loss minus the first loss.

It may be understood that a computer device may alternatively update the model parameters by maximizing the target loss. In this case, the constructed target loss is positively correlated with the first loss and negatively correlated with the second loss. For example, the target loss is equal to the first loss minus the second loss.

In the foregoing method for training a model, the encryption network and the detection network in the joint model for encryption and detection based on a neural network are obtained by joint training. The encryption network can ensure that there is a certain difference between the to-be-detected image and the encrypted image, and the detection network can ensure the accuracy of liveness detection on the encrypted image, so that the joint model for encryption and detection has the capability of performing liveness detection while encrypting the to-be-detected image.

In an embodiment, as shown in FIG. 1, a face liveness detection system is provided, including a terminal 102 and a liveness detection server 104.

The terminal 102 is configured to obtain a to-be-detected image, extract an image feature of the to-be-detected image through an encryption network in a joint model for encryption and detection, and perform image reconstruction based on the image feature to obtain an encrypted image corresponding to the to-be-detected image.

The terminal 102 is further configured to transmit the encrypted image to the liveness detection server.

The liveness detection server 104 is configured to receive the encrypted image and perform liveness detection on the encrypted image through a detection network in the joint model for encryption and detection to obtain a liveness detection result of the to-be-detected object in the to-be-detected image.

The liveness detection server 104 is further configured to return the liveness detection result to the terminal.

In an embodiment, the liveness detection server 104 may be further configured to perform data enhancement on an encrypted image to obtain a plurality of expanded images; perform liveness detection on each expanded image through a detection network in a joint model for encryption and detection to obtain a liveness detection result corresponding to each expanded image; and determine a liveness detection result of a to-be-detected object in a to-be-detected image according to the liveness detection result corresponding to each expanded image.

In the foregoing face liveness detection system, the encryption network and the detection network in the joint model for encryption and detection based on a neural network are obtained by joint training. The encryption network can ensure that there is a certain difference between the to-be-detected image and the encrypted image, and the detection network can ensure the accuracy of liveness detection on the encrypted image, so that the joint model for encryption and detection has the capability of performing liveness detection while encrypting the to-be-detected image. In this case, after the terminal obtains the to-be-detected image, the image feature of the to-be-detected image is extracted through the encryption network in the joint model for encryption and detection obtained by pre-training, and image reconstruction is performed based on the image feature to obtain the encrypted image that is different from the original to-be-detected image, so that the content of the original to-be-detected image cannot be obtained through the encrypted image. Subsequently, the liveness detection server receives the encrypted image transmitted by the terminal, and the liveness detection is performed based on the encrypted image through the detection network in the joint model for encryption and detection, which does not need to directly analyze the original to-be-detected image and can reduce the risk of leakage of user privacy caused by the theft of the to-be-detected image during liveness detection, protecting the personal privacy of the user. In addition, the liveness detection is performed on the encrypted image through the detection network in the joint model for encryption and detection, which can ensure the accuracy of liveness detection.

It is to be understood that the steps in the flowcharts of FIG. 2, FIG. 5, FIG. 7, and FIG. 8 are displayed in sequence based on indication of arrows, but these steps are not necessarily performed in sequence based on a sequence indicated by the arrows. Unless otherwise explicitly specified in this application, execution of the steps is not strictly limited, and the steps may be performed in other sequences. In addition, at least some steps in FIG. 2, FIG. 5, FIG. 7, and FIG. 8 may include a plurality of steps or a plurality of stages. The steps or the stages are not necessarily performed at the same moment, and instead may be performed at different moments. The steps or the stages are not necessarily performed sequentially, and instead may be performed in turn or alternately with another step or at least some of steps or stages of the another step.

Figure 9:
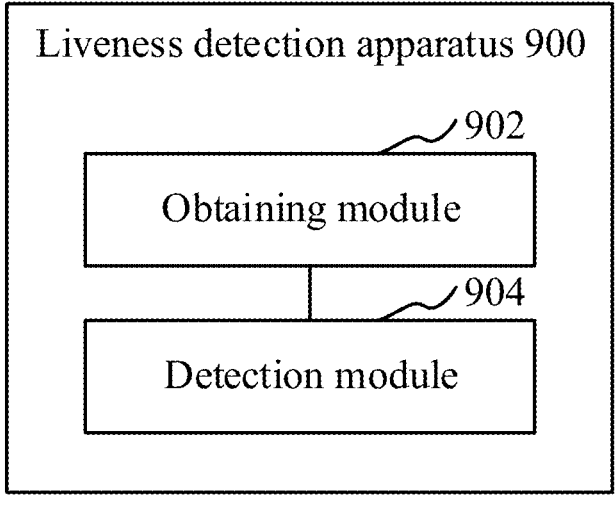
FIG. 9 is a structural block diagram of a face liveness detection apparatus according to an embodiment.

In an embodiment, as shown in FIG. 9, a face liveness detection apparatus 900 is provided. The apparatus may be a software module or a hardware module, or a combination thereof to form a part of a terminal. The apparatus specifically includes: an obtaining module 902 and a detection module 904.

The obtaining module 902 is configured to obtain a to-be-detected image.

The detection module 904 is configured to extract an image feature of the to-be-detected image through an encryption network in a joint model for encryption and detection, perform image reconstruction based on the image feature to obtain an encrypted image corresponding to the to-be-detected image, and perform liveness detection on the encrypted image through a detection network in the joint model for encryption and detection to obtain a liveness detection result of a to-be-detected object in the to-be-detected image.

In an embodiment, the foregoing face liveness detection apparatus 900 further includes a transmission module, configured to transmit the encrypted image to a liveness detection server to instruct the liveness detection server to receive the encrypted image and then perform liveness detection on the encrypted image through the detection network in the joint model for encryption and detection to obtain the liveness detection result of the to-be-detected object in the to-be-detected image.

In an embodiment, the foregoing face liveness detection apparatus 900 further includes a model training module, configured to obtain a plurality of training samples; and adjust model parameters of an initial neural network model by using the plurality of training samples to obtain the joint model for encryption and detection.

In an embodiment, the model training module is further configured to obtain a training sample, the training sample including a sample image and a real liveness category corresponding to the sample image; extract an image feature of the sample image through an encryption network in an initial neural network model, perform image reconstruction based on the image feature to obtain an encrypted image corresponding to the sample image, and determine a first loss according to a difference between the sample image and the encrypted image; perform liveness detection on the encrypted image through a detection network in the initial neural network model to obtain a predicted liveness category corresponding to the sample image, and determine a second loss according to a difference between the real liveness category and the predicted liveness category; and adjust model parameters of the initial neural network model according to the first loss and the second loss, and obtain a next training sample to continue training, until a trained joint model for encryption and detection is obtained.

In an embodiment, the model training module is further configured to obtain an original feature value corresponding to each pixel in the sample image; obtain an alternative feature value corresponding to each pixel in the encrypted image; and calculate the first loss according to a difference between the original feature value and the alternative feature value of a same pixel.

In an embodiment, the model training module is further configured to construct a target loss based on the first loss and the second loss; and adjust the model parameters according to the target loss to increase the difference between the encrypted image outputted by the adjusted encryption network and the original sample image, and reduce the difference between the predicted liveness category outputted by the adjusted detection network and the real liveness category.

In an embodiment, the foregoing face liveness detection apparatus 900 further includes a data enhancement module, configured to perform data enhancement on the encrypted image to obtain a plurality of expanded images; and the foregoing detection module 904 further configured to perform liveness detection on each of the expanded images through the detection network in the joint model for encryption and detection to obtain a liveness detection result corresponding to each of the expanded images; and determine the detection result of the to-be-detected object in the to-be-detected image according to the liveness detection result corresponding to each of the expanded images.

Figure 10:
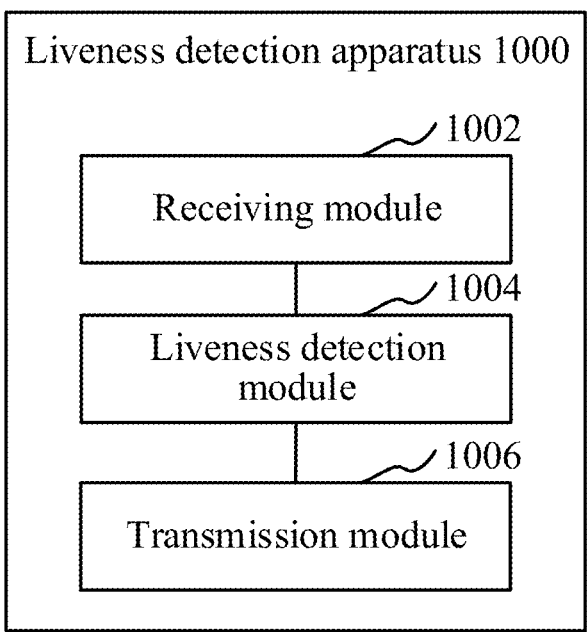
FIG. 10 is a structural block diagram of a face liveness detection apparatus according to another embodiment.

In an embodiment, as shown in FIG. 10, a face liveness detection apparatus 1000 is provided. The apparatus may be a software module or a hardware module, or a combination thereof to form a part of a liveness detection server. The apparatus specifically includes: a receiving module 1002, a liveness detection module 1004, and a transmission module 1006.

The receiving module 1002 is configured to receive an encrypted image transmitted by a terminal, the encrypted image being an image obtained by the terminal extracting an image feature of a to-be-detected image through an encryption network in a trained joint model for encryption and detection and performing image reconstruction based on the image feature.

The liveness detection module 1004 is configured to perform liveness detection on the encrypted image through a detection network in the joint model for encryption and detection to obtain a liveness detection result of the to-be-detected object in the to-be-detected image.

The transmission module 1006 is configured to return the liveness detection result to the terminal.

In the foregoing face liveness detection apparatus, the encryption network and the detection network in the joint model for encryption and detection based on a neural network are obtained by joint training. The encryption network can ensure that there is a certain difference between the to-be-detected image and the encrypted image, and the detection network can ensure the accuracy of liveness detection on the encrypted image, so that the joint model for encryption and detection has the capability of performing liveness detection while encrypting the to-be-detected image. In this case, after the to-be-detected image is obtained, the image feature of the to-be-detected image is extracted through the encryption network in the joint model for encryption and detection, and image reconstruction is performed based on the image feature to obtain the encrypted image that is different from the original to-be-detected image, so that the content of the original to-be-detected image cannot be obtained through the encrypted image. Subsequently, the liveness detection is performed based on the encrypted image through the detection network in the joint model for encryption and detection, which does not need to directly analyze the original to-be-detected image and can reduce the risk of leakage of user privacy caused by the theft of the to-be-detected image during liveness detection, protecting the personal privacy of the user. In addition, the liveness detection is performed on the encrypted image through the detection network in the joint model for encryption and detection, which can ensure the accuracy of liveness detection.

For a specific limitation on the face liveness detection apparatus, refer to the limitation on the face liveness detection method. Details are not described herein again. Each module in the face liveness detection apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 11:
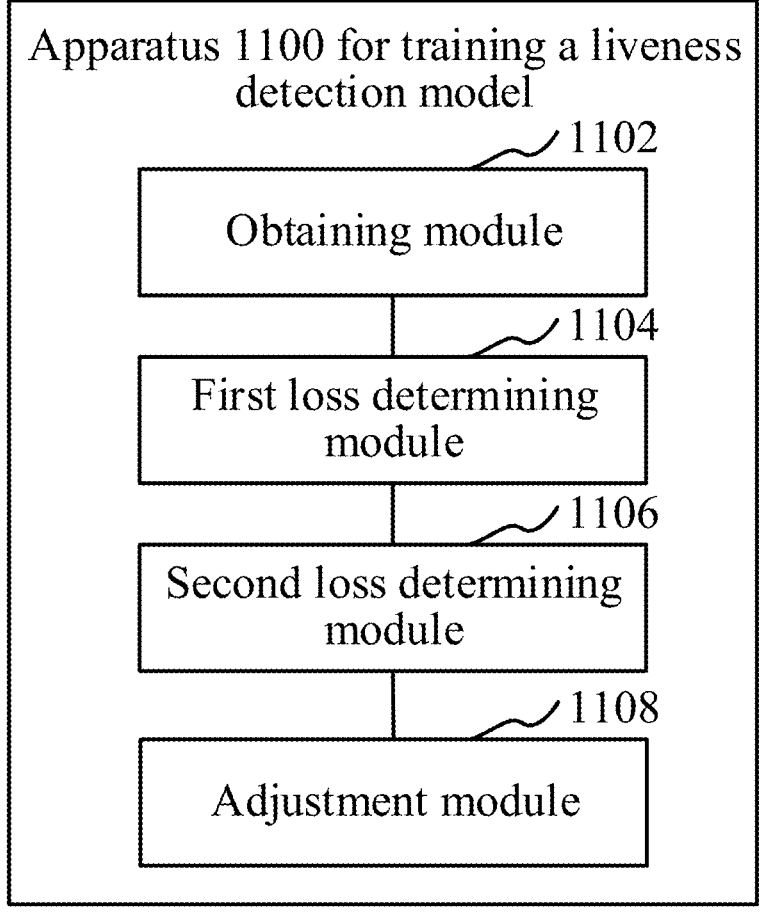
FIG. 11 is a structural block diagram of an apparatus for training a model according to an embodiment.

In an embodiment, as shown in FIG. 11, an apparatus 1100 for training a model is provided. The apparatus may be a software module or a hardware module, or a combination thereof to form a part of a computer device. The apparatus specifically includes: an obtaining module 1102, a first loss determining module 1104, a second loss determining module 1106, and an adjustment module 1108.

The obtaining module 1102 is configured to obtain a training sample, the training sample including a sample image and a real liveness category corresponding to the sample image.

The first loss determining module 1104 is configured to extract an image feature of the sample image through an encryption network in an initial neural network model, perform image reconstruction based on the image feature to obtain an encrypted image corresponding to the sample image, and determine a first loss according to a difference between the sample image and the encrypted image.

The second loss determining module 1106 is configured to perform liveness detection on the encrypted image through a detection network in the initial neural network model to obtain a predicted liveness category corresponding to the sample image, and determine a second loss according to a difference between the real liveness category and the predicted liveness category.

The adjustment module 1108 is configured to adjust model parameters of the initial neural network model according to the first loss and the second loss, and obtain a next training sample to continue training, until a trained joint model for encryption and detection is obtained.

In the foregoing apparatus for training a model, the encryption network and the detection network in the joint model for encryption and detection based on a neural network are obtained by joint training. The encryption network can ensure that there is a certain difference between the to-be-detected image and the encrypted image, and the detection network can ensure the accuracy of liveness detection on the encrypted image, so that the joint model for encryption and detection has the capability of performing liveness detection while encrypting the to-be-detected image.

For a specific limitation on the apparatus for training a model, refer to the limitation on the method for training a model. Details are not described herein again. Each module in the apparatus for training a model may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In various embodiments in the present disclosure, a module or similar term may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

In an embodiment, a computer device is provided. The computer device may be a terminal or a liveness detection server, and an internal structure diagram thereof may be shown in FIG. 12. When the computer device is a terminal, the terminal may also include an image collection apparatus, for example, a camera. The computer device includes a processor, a memory, and a network interface that are connected by a system bus. The processor of the computer device is configured to provide computing and control capabilities. The memory of the computer device includes a non-volatile storage medium and an internal memory. The non-volatile storage medium stores an operating system and a computer-readable instruction. The internal memory provides an environment for running of the operating system and the computer-readable instruction in the non-volatile storage medium. The network interface of the computer device is configured to communicate with an external computer device through a network connection. The computer-readable instruction is executed by the processor to implement a face liveness detection method and/or a method for training a model.

Figure 12:
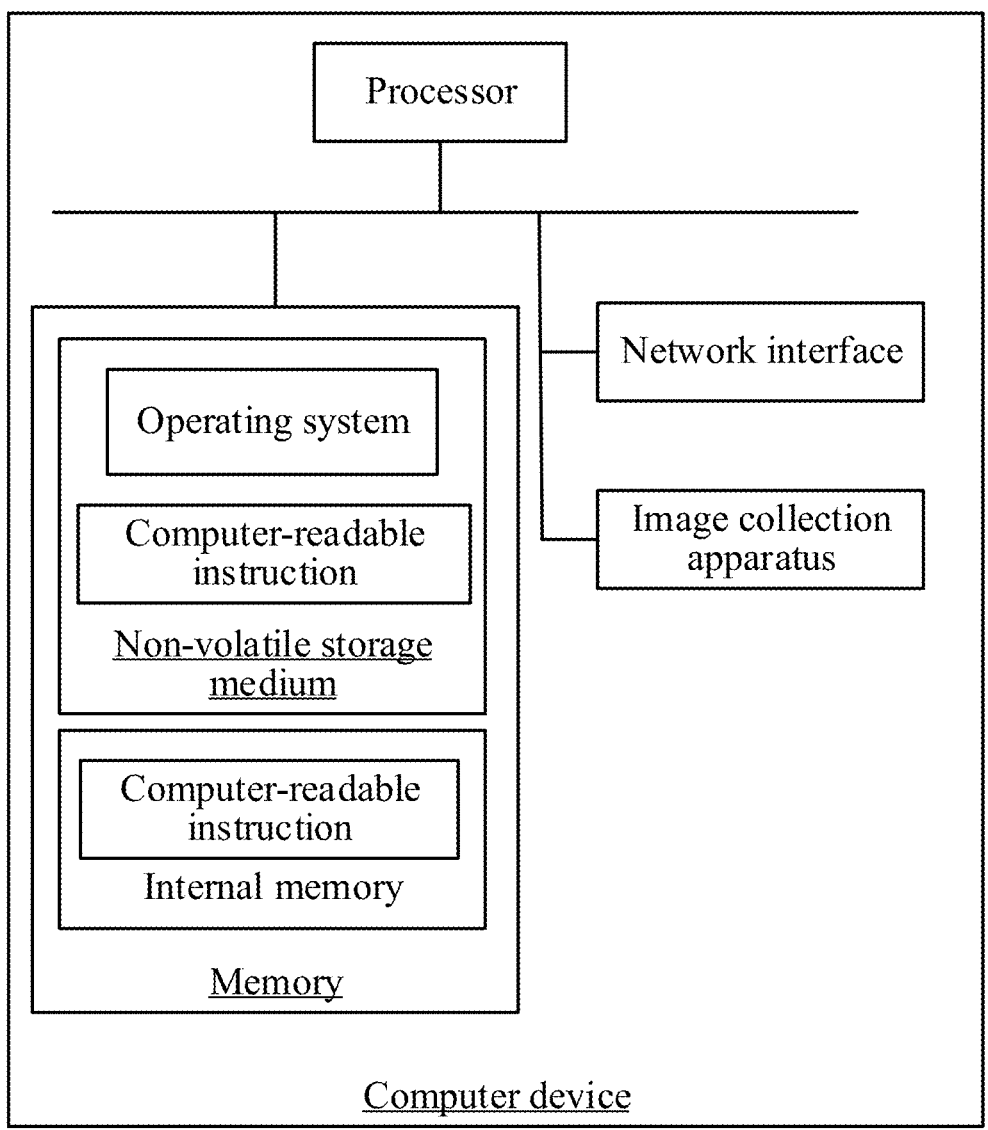
FIG. 12 is a diagram of an internal structure of a computer device according to an embodiment.

A person skilled in the art may understand that, the structure shown in FIG. 12 is only a block diagram of a part of a structure related to a solution of this application and does not limit the computer device to which the solution of this application is applied. Specifically, the computer device may include more or fewer components than those in the drawings, or some components are combined, or a different component deployment is used.

In an embodiment, a computer device is further provided, including a memory and a processor. The memory stores a computer-readable instruction. The processor, when executing the computer-readable instruction, implements the steps in the foregoing method embodiments.

In an embodiment, a computer-readable storage medium is provided, storing a computer-readable instruction. The computer-readable instruction, when executed by a processor, implements the steps in the foregoing method embodiments.

In an embodiment, a computer program product or a computer program is provided. The computer program product or the computer program includes a computer instruction, and the computer instruction is stored in a computer-readable storage medium. The processor of the computer device reads the computer instruction from the computer-readable storage medium, and the processor executes the computer instruction, to cause the computer device to perform the steps in the foregoing method embodiments.

A person of ordinary skill in the art may understand that all or some of the procedures of the methods of the above embodiments may be implemented by computer-readable instructions instructing relevant hardware. The computer-readable instruction may be stored in a non-volatile computer-readable storage medium. When the computer-readable instruction is executed, the computer-readable instruction may include the procedures of the embodiments of the above methods. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be combined in different manners. For concise description, not all possible combinations of the technical features in the foregoing embodiment are described. However, provided that combinations of the technical features do not conflict with each other, the combinations of the technical features are considered as falling within the scope recorded in this specification.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application is subject to the protection scope of the appended claims.

What is claimed is:

1. A method for detecting a liveness of a face in an image, performed by a computer device, the method comprising:

training, based on a plurality of sample images, a joint model for encryption and detection, wherein the training comprises, for each sample image:

determining a first loss according to a difference between the sample image and an encrypted sample image corresponding to the sample image;

performing liveness detection on the encrypted sample image through a detection network in the joint model to obtain a predicted liveness category;

determining a second loss according to a difference between the predicted liveness category based on the encrypted sample image and a real liveness category of the sample image; and adjusting, according to the first loss and the second loss, model parameters of the joint model by:

constructing a target loss based on the first loss and the second loss; and adjusting the model parameters according to the target loss to increase the difference between the encrypted sample image outputted by the adjusted encryption network and the corresponding sample image, and reduce the difference between the predicted liveness category outputted by the adjusted detection network and the real liveness category;

obtaining an image captured by a camera associated with a user device, wherein the image comprises a face of an object;

extracting an image feature of the image through an encryption network in the joint model for encryption and detection;

performing image reconstruction based on the image feature to obtain an encrypted image corresponding to the image, the encrypted image being different in image content from the image;

transmitting the encrypted image to a liveness detection server;

performing, by the liveness detection server, liveness detection on the encrypted image through a detection network in the joint model for encryption and detection to obtain a liveness detection result of the object in the image, wherein the liveness detection result indicates whether the image was captured by the camera from a living body; and receiving the liveness detection result of the object in the image from the liveness detection server.

2. The method according to claim 1, wherein the joint model comprises a convolutional neural network model.

3. The method according to claim 1, wherein the training further comprises, for each sample image of the plurality of sample images:

inputting a real liveness category corresponding to the sample image to the joint model;

obtaining the encrypted sample image by:

extracting a sample image feature of the sample image through an encryption network in the joint model; and performing image reconstruction based on the sample image feature.

4. The method according to claim 1, wherein the determining the first loss according to the difference between the sample image and the encrypted sample image comprises:

obtaining an original feature value corresponding to each pixel in the sample image;

obtaining an alternative feature value corresponding to each pixel in the encrypted sample image; and calculating the first loss according to a difference between the original feature value and the alternative feature value of each corresponding pixel.

5. The method according to claim 1, wherein:

the obtaining the image comprises:

obtaining a face image for identity verification; and the method further comprises:

in a case that the liveness detection result indicates that a face in the face image is a living body, determining that the identity verification of the face image is successful.

6. The method according to claim 1, wherein:

the method further comprises:

performing data enhancement on the encrypted image to obtain a plurality of expanded images; and the liveness detection server is configured to perform liveness detection on the encrypted image through the detection network in the joint model for encryption and detection to obtain the liveness detection result of the object in the image by:

performing liveness detection on each of the expanded images through the detection network in the joint model for encryption and detection to obtain a detection result corresponding to each of the expanded images; and determining the liveness detection result of the object in the image according to the detection result corresponding to each of the expanded images.

7. An apparatus for detecting a liveness of a face in an image, the apparatus comprising:

a processor; and a memory storing instructions, when executed by the processor, cause the apparatus to perform:

training, based on a plurality of sample images, a joint model for encryption and detection, wherein the training comprises, for each sample image:

determining a first loss according to a difference between the sample image and an encrypted sample image corresponding to the sample image;

performing liveness detection on the encrypted sample image through a detection network in the joint model to obtain a predicted liveness category;

determining a second loss according to a difference between a predicated liveness category based on the encrypted sample image and a real liveness category of the sample image; and adjusting, according to the first loss and the second loss, model parameters of the joint model by;

constructing a target loss based on the first loss and the second loss; and adjusting the model parameters according to the target loss to increase the difference between the encrypted sample image outputted by the adjusted encryption network and the corresponding sample image, and reduce the difference between the predicted liveness category outputted by the adjusted detection network and the real liveness category;

obtaining an image captured by a camera associated with a user device, wherein the image comprises a face of an object;

extracting an image feature of the image through an encryption network in a joint model for encryption and detection;

performing image reconstruction based on the image feature to obtain an encrypted image corresponding to the image, the encrypted image being different in image content from the image;

transmitting the encrypted image to a liveness detection server;

performing, by the liveness detection server, liveness detection on the encrypted image through a detection network in the joint model for encryption and detection to obtain a liveness detection result of the object in the image, wherein the liveness detection result indicates whether the image was captured by the camera from a living body; and receiving the liveness detection result of the object in the image from the liveness detection server.

8. The apparatus according to claim 7, wherein the joint model comprises a convolutional neural network model.

9. The apparatus according to claim 7, wherein the instructions, when executed by the processor, cause the apparatus to train the joint model by, for each sample image, performing actions comprising:

inputting a real liveness category corresponding to the sample image to the joint model;

obtaining the encrypted sample image by:

extracting a sample image feature of the sample image through an encryption network in the joint model; and performing image reconstruction based on the sample image feature.

10. The apparatus according to claim 7, wherein the instructions, when executed by the processor, cause the apparatus to determine the first loss according to the difference between the sample image and the encrypted sample image by performing actions comprising:

obtaining an original feature value corresponding to each pixel in the sample image;

obtaining an alternative feature value corresponding to each pixel in the encrypted sample image; and calculating the first loss according to a difference between the original feature value and the alternative feature value of each corresponding pixel.

11. The apparatus according to claim 7, wherein the instructions, when executed by the processor, cause the apparatus to perform obtaining the image by:

obtaining a face image for identity verification; and when the processor executes the instructions, the processor is configured to cause the apparatus to further perform:

in a case that the liveness detection result indicates that a face in the face image is a living body, determining that the identity verification of the face image is successful.

12. The apparatus according to claim 7, wherein the instructions, when executed by the processor, cause the apparatus to further perform:

performing data enhancement on the encrypted image to obtain a plurality of expanded images; and wherein the liveness detection server is configured to perform liveness detection on the encrypted image through the detection network in the joint model for encryption and detection to obtain the liveness detection result of the object in the image by:

performing liveness detection on each of the expanded images through the detection network in the joint model for encryption and detection to obtain a detection result corresponding to each of the expanded images; and determining the liveness detection result of the object in the image according to the detection result corresponding to each of the expanded images.

13. A non-transitory computer-readable storage medium, storing computer-readable instructions, wherein, the computer-readable instructions, when executed by a processor, are configured to cause the processor to perform:

training, based on a plurality of sample images, a joint model for encryption and detection, wherein the training comprises, for each sample image:

determining a first loss according to a difference between the sample image and an encrypted sample image corresponding to the sample image;

performing liveness detection on the encrypted sample image through a detection network in the joint model to obtain a predicted liveness category;

determining a second loss according to a difference between a predicated liveness category based on the encrypted sample image and a real liveness category of the sample image; and adjusting, according to the first loss and the second loss, model parameters of the joint model by:

constructing a target loss based on the first loss and the second loss; and adjusting the model parameters according to the target loss to increase the difference between the encrypted sample image outputted by the adjusted encryption network and the corresponding sample image, and reduce the difference between the predicted liveness category outputted by the adjusted detection network and the real liveness category;

obtaining an image captured by a camera associated with a user device, wherein the image comprises a face of an object;

extracting an image feature of the image through an encryption network in a joint model for encryption and detection;

performing image reconstruction based on the image feature to obtain an encrypted image corresponding to the image, the encrypted image being different in image content from the image;

transmitting the encrypted image to a liveness detection server;

performing, by the liveness detection server, liveness detection on the encrypted image through a detection network in the joint model for encryption and detection to obtain a liveness detection result of the object in the image, wherein the liveness detection result indicates whether the image was captured by the camera from a living body; and receiving the liveness detection result of the object in the image from the liveness detection server.

14. The non-transitory computer-readable storage medium according to claim 13, wherein: the joint model comprises a convolutional neural network model.

15. The non-transitory computer-readable storage medium according to claim 13, wherein the computer-readable instructions, when executed by a processor, are configured to cause the processor to train the joint model by, for each sample image of the plurality of sample images:

inputting a real liveness category corresponding to the sample image to the joint model;

obtaining the encrypted sample image by:

extracting a sample image feature of the sample image through an encryption network in the joint model;

performing image reconstruction based on the sample image feature.

16. The non-transitory computer-readable storage medium according to claim 13, wherein the instructions, when executed, cause determining the first loss according to the difference between the sample image and the encrypted sample image by:

obtaining an original feature value corresponding to each pixel in the sample image;

obtaining an alternative feature value corresponding to each pixel in the encrypted sample image; and calculating the first loss according to a difference between the original feature value and the alternative feature value of each corresponding pixel.

17. The non-transitory computer-readable storage medium according to claim 13, wherein the computer-readable instructions are configured to cause the processor to perform:

obtaining a face image for identity verification; and the computer-readable instructions, when executed by the processor, are configured to further cause the processor to perform:

in a case that the liveness detection result indicates that a face in the face image is a living body, determining that the identity verification of the face image is successful.

* * * * *